US007936269B2

(12) United States Patent
Persson et al.

(10) Patent No.: US 7,936,269 B2
(45) Date of Patent: May 3, 2011

(54) REGISTRATION SIGN FOR VEHICLES AND METHOD FOR THE MANUFACTURE THEREOF

(75) Inventors: Jan Persson, Bandyvägen (SE); Kent Fält, Bandyvägen (SE)

(73) Assignee: AB Scandinavian Motorcenter, Danderyd (SE)

( * ) Notice: Subject to any disclaimer, the term of this patent is extended or adjusted under 35 U.S.C. 154(b) by 268 days.

(21) Appl. No.: 12/299,492

(22) PCT Filed: Apr. 27, 2007

(86) PCT No.: PCT/SE2007/000408
§ 371 (c)(1),
(2), (4) Date: Nov. 4, 2008

(87) PCT Pub. No.: WO2007/129949
PCT Pub. Date: Nov. 15, 2007

(65) Prior Publication Data
US 2009/0265966 A1   Oct. 29, 2009

(30) Foreign Application Priority Data
May 5, 2006   (SE) ...................................... 0601010

(51) Int. Cl.
*G08B 13/14* (2006.01)
(52) U.S. Cl. ............... 340/572.1; 340/572.7; 340/572.8; 340/10.42; 340/693.5; 340/933; 40/643; 248/352
(58) Field of Classification Search ............... 340/572.1, 340/572.7, 572.8, 10.1, 10.42, 693.5, 933; 40/591, 643; 248/352
See application file for complete search history.

(56) References Cited

U.S. PATENT DOCUMENTS

| 5,783,265 | A | 7/1998 | Parkander | |
| 6,025,784 | A | 2/2000 | Mish | |
| 6,628,209 | B1 | 9/2003 | Rother | |
| 6,876,296 | B2 * | 4/2005 | Talmadge et al. | 340/10.42 |
| 7,034,688 | B2 * | 4/2006 | Rietzler et al. | 340/572.7 |
| 7,317,397 | B2 * | 1/2008 | Gunsauley | 340/572.1 |
| 7,463,150 | B2 * | 12/2008 | Rajan | 340/572.1 |
| 7,704,346 | B2 * | 4/2010 | Cote | 156/253 |
| 2004/0164865 | A1 | 8/2004 | de Velasco Cortina | |

FOREIGN PATENT DOCUMENTS

EP   1 120 316 A2   8/2001
WO   WO-03/032247 A1   4/2003

* cited by examiner

*Primary Examiner* — Davetta W Goins
(74) *Attorney, Agent, or Firm* — Tarolli, Sundheim, Covell & Tummino LLP

(57) ABSTRACT

The present invention relates to a registration sign for vehicles, where the registration sign (2) comprises a sign package (38) consisting of individual plastic film sections (6a, 9a), a bottom sheet (18) and a front panel (12), and also comprises a frame (21) which surrounds the sign package. According to the invention, the registration sign (2) comprises in addition at least one transponder (50) for receiving and/or transmitting radio signals and the transponder (50) is embedded in the frame (21). The present invention also relates to a method for the manufacture of a registration sign whereby at least one transponder (50) is fastened on and/or in the sign package (38) for the registration sign (2) and the transponder 50 is embedded in the frame (21) when the latter is injection-molded round the edges of the sign package (38).

38 Claims, 4 Drawing Sheets

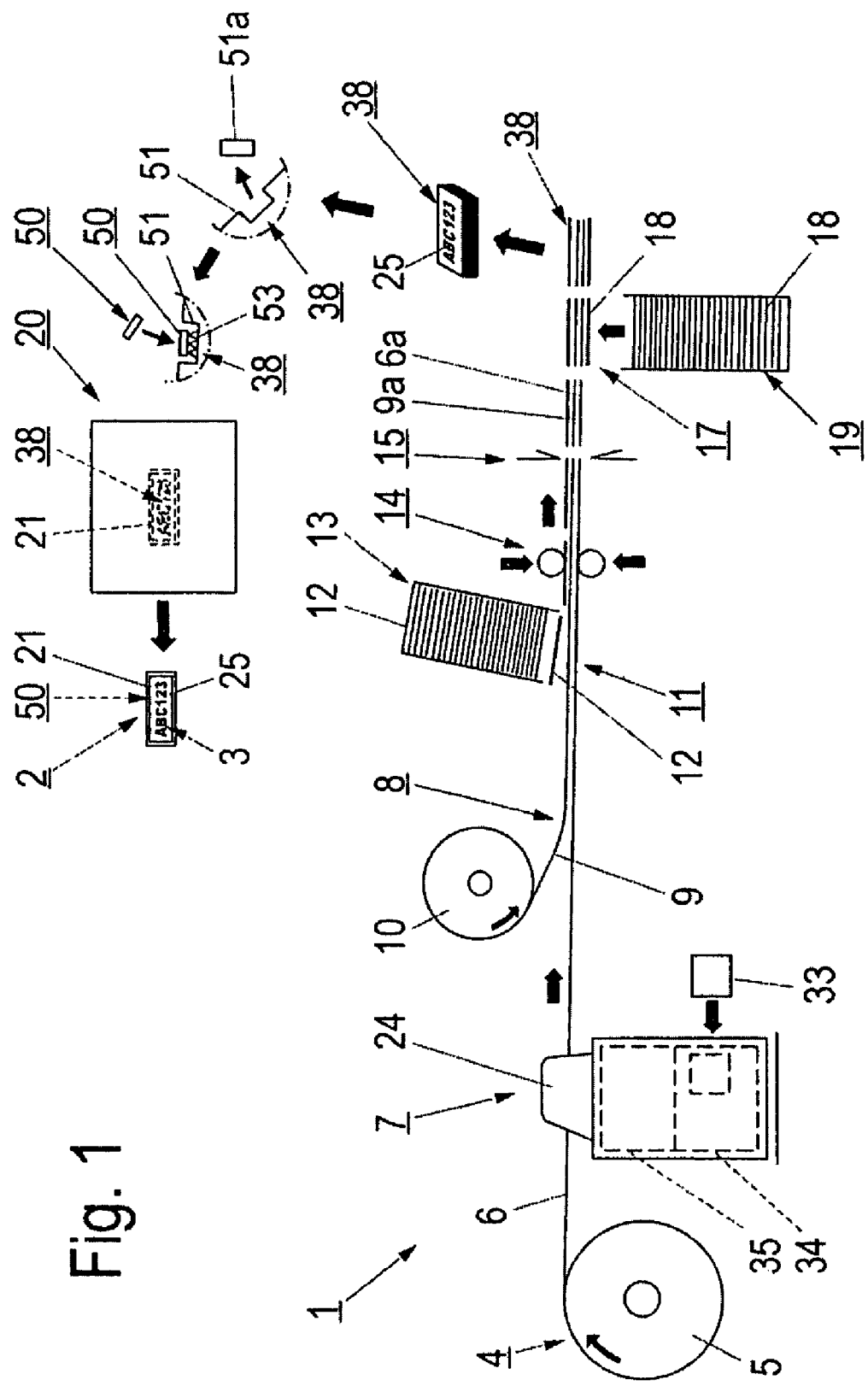

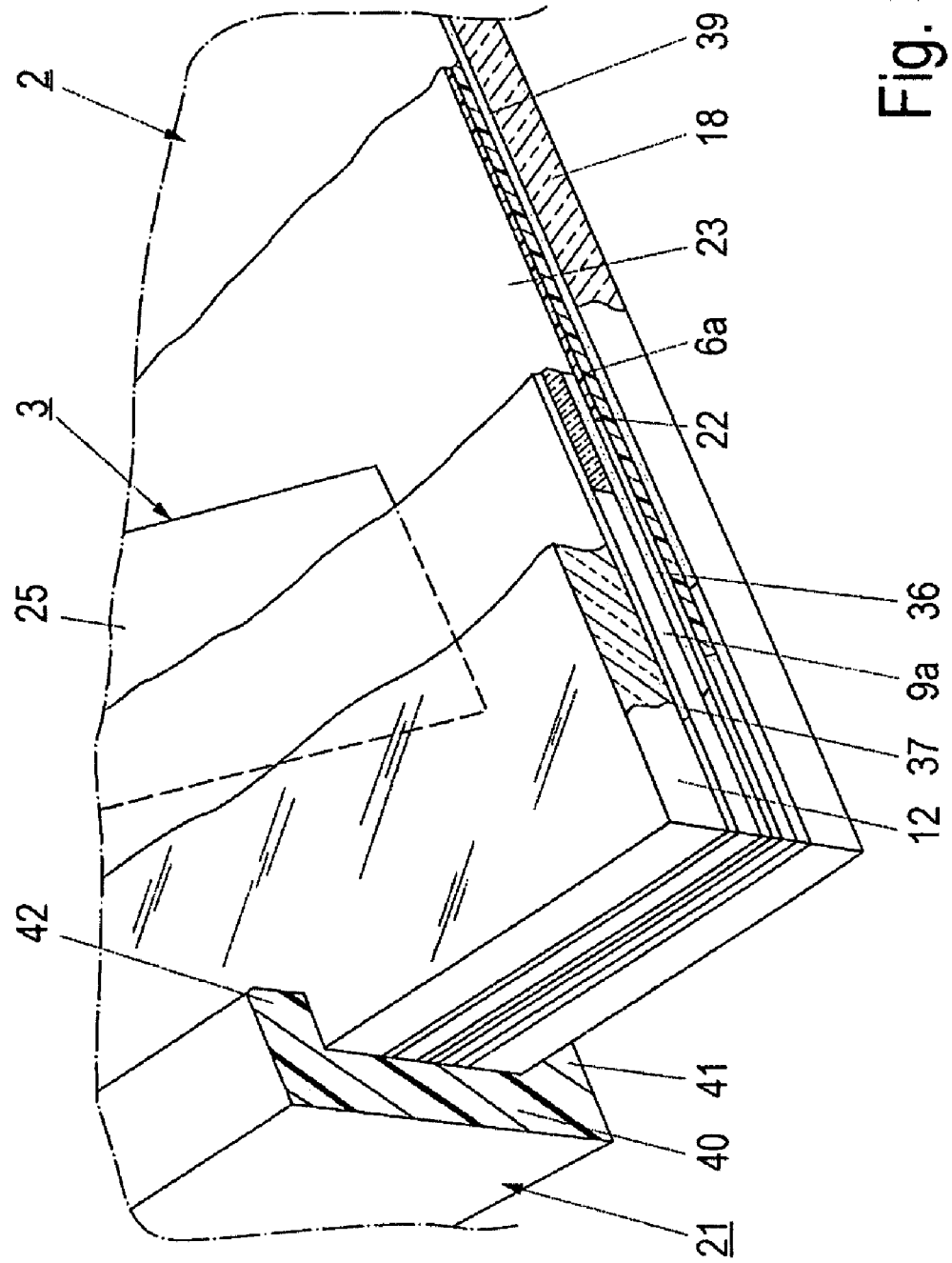

REGISTRATION SIGN FOR VEHICLES AND METHOD FOR THE MANUFACTURE THEREOF

FIELD OF THE INVENTION

The present invention relates to a registration sign for vehicles according to the preamble of claim 1 and a method for the manufacture thereof according to the preamble of claim 21.

BACKGROUND OF THE INVENTION

A known practice from U.S. Pat. No. 5,783,265 is the production of sealed registration signs made of plastic material for vehicles. Such signs have been found to be very advantageous.

A known practice from U.S. Pat. No. 6,025,784 is registration signs for vehicles being provided with transponders for reception and/or transmission of radio signals.

Transponders can contain information of various kinds, e.g. information about the vehicle's registration number, chassis number, make etc. The information is read by means of suitable equipment, e.g. on or beside the carriageway. It is thus possible to compare information which appears on a vehicle's signs with information in the vehicle register, i.e. to check that the signs pertain to the correct vehicle. Information obtained can also be used for many other purposes, e.g. for traffic audit, travelling time audit, running times, running speeds and for various kinds of neutral statistics.

However, the first-mentioned registration signs are not designed to allow the use of transponders for reception and/or transmission of radio signals via them, nor to allow rapid and sealed association with transponders to them.

SUMMARY OF THE INVENTION

The object of the present invention is therefore to achieve sealed registration signs of the kind indicated in the introduction made of plastic material, to provide them with transponders for reception and/or transmission of radio signals, to make it possible for the signs not to hinder or damp radio signals to and/or from the transponders, and to present a method by which transponders can be quickly sealed to signs.

This object is achieved according to the invention by means of a registration sign with the characterising features indicated in claim 1 and by a method which entails the characterising operations indicated in claim 21.

A transponder disposed on and/or in portions of a registration sign which lack the light-reflecting layer results in the latter causing no interference to radio signals to and/or from the transponder. Fastening the transponder to the sign's sign package and thereafter injection molding the frame round the sign package makes it possible for the transponder to be quickly sealed thereto.

BRIEF DESCRIPTION OF THE DRAWING

The abovementioned and other characterizing features/operations and consequent advantages of the invention are described below in more detail with reference to the attached drawings, in which:

FIG. 1 illustrates schematically an advantageous installation for the manufacture of registration signs for vehicles by the method according to the invention;

FIG. 3 illustrates in enlarged perspective view a corner portion of the sign according to FIG. 2 whereby the various constituent parts of the sign are partly shown in section.

DESCRIPTION OF EXAMPLE EMBODIMENT

Figure 1A:
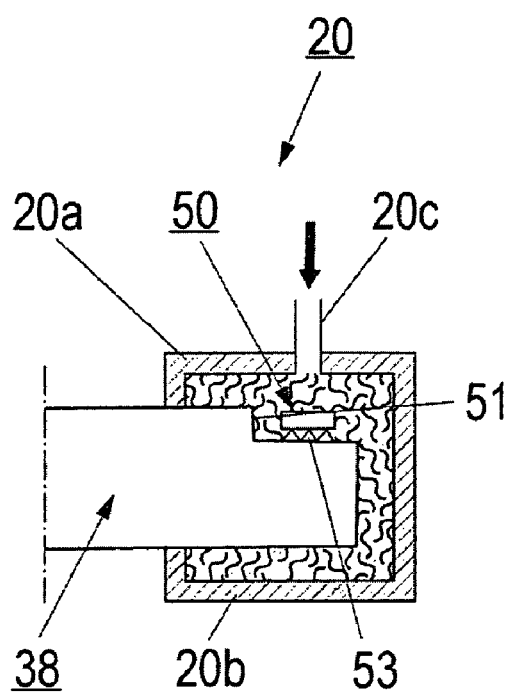
FIGS. 1a and 1b illustrate schematically two stages of the injection molding of a frame about a transponder in a registration sign.

The installation 1 schematically illustrated in FIG. 1 is intended for continuous manufacture of registration signs 2 for vehicles with different registration numbers 3, e.g. in consecutive numerical sequence ABC 123, ABC 124, ABC 125, ABC 126 . . . , ABC 130 and so on. The installation 1 comprises a station 4 with a plastic film roll 5 from which a plastic film strip 6 is drawn off (alternatively the station 4 may have, instead of a roll, a magazine for plastic film sections 6a). The plastic film strip 6 is passed through a registration number print station 7 to a station 8 where a transparent plastic film strip 9, here with adhesive characteristics on both sides, is applied to the plastic film strip 6 from a roll 10 of likewise transparent plastic film. The plastic film strips 6, 9 are passed through a station 11 where front panels 12 made of plastic material are applied to the strips from a front panel magazine 13. The plastic film strips 6, 9 with front panels 12 fixed to them are passed through a pressing station 14 and thereafter through a cutting station 15 where the strips are cut to individual plastic film sections 6a and 9a respectively in such a way that each section 6a has a complete registration number 3. The plastic film sections 6a, 9a are passed together with the front panels 12 through a station 17 where bottom sheets 18 made of plastic material are applied from a magazine 19, after which the sign package 38 comprising one each of said plastic film sections 6a and 9a, front panels 12 and bottom sheets 18 are finally passed through an injection molding device 20 in which a frame 21 is injection-molded round the respective sign package 38. This injection molding operation completes the registration sign 2.

It should be noted for the record that the joined-together plastic film strips 6, 9 might also be cut before the front panels 12 are applied to them or after the bottom sheets 18 have been applied, but in either case before the frame 21 is injection-molded around the sign package 38.

The film strip 6 running through the registration number print station 7 is provided on its upper side with a layer 22 of light-reflecting material constituting a light-reflecting surface 23. The light-reflecting layer 22 preferably consists of or exhibits metal material, e.g. in the form of metal particles. The surface 23 of the light-reflecting layer 22 reflects inter alia headlamp light from other vehicles.

The printing of registration numbers is effected continuously on the light-reflecting layer 22 of the plastic film strip 6 by means of a printer 24 which applies toner material 25 to the surface 23 of the layer as the strip 6 runs through the printer at full speed. The printer 24 may be of any suitable type with such image transfer function on continuous strips, e.g. ionographic or other electronic printers, inkjet printers or hot image-transferring printers. Such printers are known with regard both to design and to function and are therefore not here described in detail.

The printer 24 is caused to print registration numbers and possibly other symbols 3 on the surface 23 of the light-reflecting layer 22 of the plastic film strip 6 in accordance with, for example, a given program which may be recorded by a customer on, for example, a diskette 33 (or be transmitted via a modem or other data carrier). The diskette 33 is placed in a computer 34 which controls a printing unit 35 which itself causes the printer 24 to continuously generate toner images corresponding to registration numbers and other symbols or information in the program and to continuously transfer these images to the layer 22 on the plastic film strip 6 as the latter runs through the printer.

The plastic film strip 6 provided with registration numbers 3 runs through the station 8 where the transparent plastic film strip 9 is continuously fastened adhesively to the upper side of the strip 6. The transparent plastic film 9 has an adhesive layer 36 on the underside to enable this fastening to the strip 6. The transparent plastic film strip 9 also has an adhesive layer 37 on its upper side for fastening the front panels 12 adhesively to it. This is effected continuously at the station 11, and the plastic film strips 6, 9 and the front panels 12 are pressed together the station 14 to ensure that they are securely fastened to one another.

The fastened-together plastic film strips 6, 9 with the front panels 12 fastened to them are cut continuously at the cutting station 15, after which the individual plastic film sections 6a, 9a and the front panels 12 are moved continuously to the station 17 for continuous application of bottom sheets 18. The bottom sheets 18 have an adhesive layer 39 on one side to enable them to be caused to adhere securely to the plastic film section 6a on the opposite side from that on which the layer 22 of light-reflecting material is situated, i.e. in this case on the underside. Alternatively, the adhesive layer 39 may be applied instead on the underside of the plastic film strip 6, or a separate adhesive layer 39 may be placed between the plastic film strip 6 and the bottom sheet 18. The sign package 38 is transferred continuously to the injection molding device 20 in which the sign package 38 is continuously provided with the frame 21. The frame 21 comprises plastic material which is injection-molded in the injection molding device 20 round the edges of the sign package 38 in such a way that it surrounds the sign package tightly round every side. The frame 21 is preferably of mainly U-shaped cross-section whereby its web portion 40 covers from outside the edges of the sign package 38 while its one limb 41 abuts tightly against the underside of the bottom sheet 18 and the other limb 42 abuts tightly against the upper side of the front panel 12.

The various components of the sign preferably comprise plastic materials of such similar kinds that the sign as a whole can be recycled. For example, the bottom sheet and the frame may be made of ABS plastic and the front panel of PMMA with UV filter.

The fact that it preferably comprises the same or closely related plastic material as the components against which it abuts, i.e. the bottom sheet, the front panel and the edges of the intermediate plastic film sections, makes it possible for the frame to be caused by the application of heat to fuse together with the plastic material of these components and thereby form with them a completely tight unit.

According to the invention, at least one transponder 50 for receiving and/or transmitting radio signals for the aforementioned purposes is disposed on and/or in the sign package 38 for the registration sign 2 described above, manufactured in the manner indicated above.

With a view to achieving optimum reception and/or transmission, those portions of the sign package 38 for the registration sign 2 which exhibit the transponder 50 at least lack said layer 22 of light-reflecting material which, comprising metal, therefore also has the ability to repel, distort or reduce radio signals. It is thus possible for radio signals to pass to and/or from the transponder 50 without being hindered or damped by the light-reflecting layer. Those portions of the sign package 38 for the registration sign 2 which exhibit the transponder 50 preferably lack both said layer 22 of light-reflecting material and the plastic film section 6a to which said light-reflecting layer is applied. Accordingly, the removal of the layer 22 of light-reflecting material from the portions of the sign package 38 for the registration sign which exhibit the transponder 50, or both that layer and the plastic film section 6a to which the layer is applied, is effected some time before the transponder is put in place, certainly not later than the stage where the plastic film strip 6 is joined together with the plastic film strip 9. Alternatively, the plastic film strip 6 may already, before it begins to be used for the manufacture of registration signs, be so configured that portions of it lack a light-reflecting layer. For example, the longitudinal edge portions of the plastic film strip 6 might already, during the manufacture of the strip, be formed without a light-reflecting layer.

With a view to achieving good reception and/or transmission, the sign package 38 for the registration sign 2, or at least those portions of the sign package 38 for the registration sign 2 which exhibit the transponder 50, may alternatively exhibit a light-reflecting layer 22 with a low content of metal material capable of hindering or damping radio signals.

The transponder 50 is preferably disposed on and/or in the sign package 38 for the registration sign before the frame 21 is injection-molded round the edges of the sign package.

Figure 2:
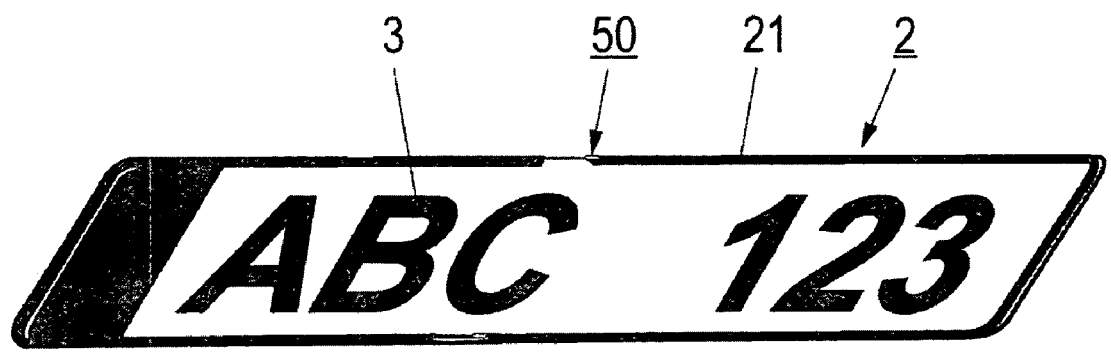
FIG. 2 illustrates in perspective view a registration sign for vehicles according to the invention which is manufactured in the installation according to FIG. 1, with the frame of the sign partly cut away to expose two alternative positions for a transponder and an antenna.

As the transponder 50 in the preferred embodiment is disposed on a lower and/or upper longitudinal edge of the registration sign 2 and preferably on a lower and/or upper longitudinal edge of the sign package 38 for the registration sign (FIG. 2), the transponder is sealed by the frame 21 when the latter is injection-molded round the edges of the sign package (FIG. 4), whereby the transponder is well protected against external influences. Positioning the transponder 50 in the lower longitudinal edge of the sign package 38 facilitates communication with, for example, transmitter and/or receiver equipment in the carriageway, while positioning the transponder in the upper longitudinal edge of the sign package facilitates communication with corresponding equipment above the carriageway.

Figure 1B:
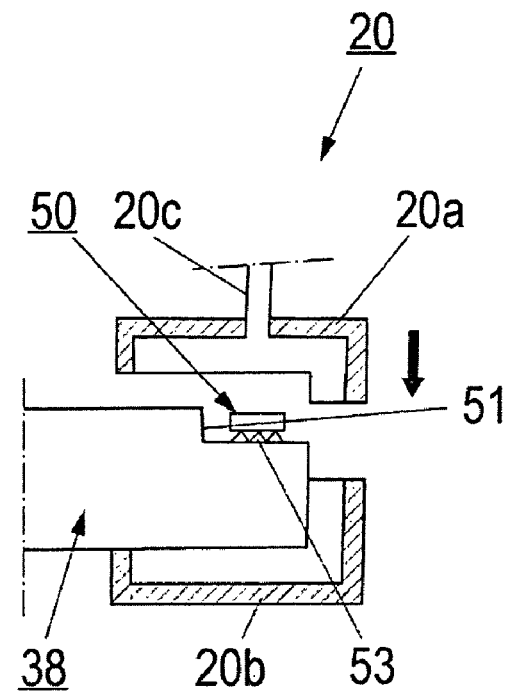

In an advantageous version, the sign package 38 of the registration sign 2 may exhibit at least one recess 51 for the transponder 50. The light-reflecting layer 22 or both it and the plastic film section 6a to which the layer is applied is/are absent in way of said recess 51 and in an edge region close to the recess. This entails the light-reflecting layer 22 or both it and the plastic film section 6a to which the layer is applied being removed from that area if the plastic film strip 6 was originally provided therewith, along with the portion 51a of the plastic film section, at the latest at the same time as the recess 51 is formed, which is with advantage effected (FIG. 1) immediately before the transponder 50 is placed on and/or in the sign (FIG. 1). Alternatively, if said light-reflecting layer 22 has, as indicated above, a low content of metal material capable of hindering or damping radio signals, there is no need for any removal of the layer or the plastic film section 6a. Forming the recess 51 in an edge portion of the sign package 38 and thereafter disposing the transponder 50 in the recess makes it possible for the frame 21, at the time of its injection molding round the edges of the sign package, to be injection-molded over the recess with the transponder and thereby seal the latter (FIGS. 1a and 1b). The injection molding is effected in such a way that the sign package 38 in the injection molding device 20 is placed between two mold sections 20a and 20b which are brought together so that at least the edges of the sign package, including any recess 51 with the transponder 50, are within the space delineated by one of the mold sections, after which a plastic compound 21a for the frame is injected into said space via an inlet 20c in one of the mold sections, in the version depicted the mold section 20a.

In a preferred version, the transponder 50 is enclosed in a glass ampoule but may of course be of any form and construction suited to the purpose.

Figure 4:
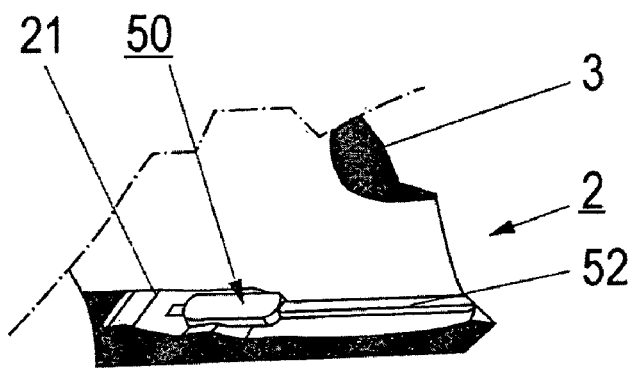
FIG. 4 illustrates in enlarged perspective view a portion of the sign according to FIG. 2 with the frame partly cut away to expose a transponder and portions of an antenna.

Thus, the transponder may where necessary be provided with an antenna 52 with a view to achieving better reception and/or transmission conditions. Like the transponder 50, any such antenna 52 may likewise be disposed on and caused to run along a lower and/or upper longitudinal edge of the sign package 38 for the registration sign (FIG. 2), after which the frame 21 is likewise injection-molded around the antenna (FIG. 4). Alternatively, the antenna 52 may be disposed in a glass ampoule together with the transponder 50. The antenna 52 consists preferably of copper wire but may also be made of some other material suitable for the purpose. In precisely the same way as for the transponder 50, the portions of the sign package 38 of the registration sign 2 which exhibit the antenna 52 lack said layer 22 of light-reflecting material or both said light-reflecting layer and the plastic film section 6a to which the layer is applied, or said layer has, as indicated above, a low content of metal material capable of hindering or damping radio signals.

The transponder 50 and the antenna 52, if any, are with advantage disposed on and/or in the sign package 38 for the registration sign 2 by adhesive bonding. The adhesive layer 53 (FIGS. 1, 1a and 1b) may be applied for the purpose to the transponder 50 and the antenna 52 or to the sign package 38 immediately before the transponder and the antenna are applied to it. These items may nevertheless also be fastened in some other way, e.g. the transponder and the glass ampoule may be clamped firmly in the recess 51, if there is one.

With regard to the transponder 50, it may also be noted that it is preferably of RFID type and operates at a UHF frequency of 860-960 MHz. The transponder 50 is also with advantage of active type with its own battery, but for certain applications it may of course also be of passive type without battery.

When the frame has been injection-molded round the edges of the sign package 38, information from the vehicle register is fed to the transponder 50 and/or information from the transponder is fed to the vehicle register, i.e. data communication has to be set up along the production line in order, for register purposes, to relate the registration number to the transponder.

It will be obvious to one skilled in the art that the registration sign for vehicles and the method for the manufacture of registration signs for vehicles according to the present invention may, in addition to what is indicated above, be varied within the scopes of the claims set out below without departing from the idea and object of the invention.

The invention claimed is:

1. A registration sign for vehicles, comprising:
a sign package (38) which exhibits a bottom sheet (18) made of plastic material, a plastic film section (6a) which is attached to the upper side of the bottom sheet by an adhesive layer (39), has a layer (22) of light-reflecting material attached to the upper side of the film and has registration symbols (3) applied to the light-reflecting layer, a transparent plastic film section (9a) which is disposed on the light-reflecting layer (22) and has adhesive layers (36, 37) on its underside and upper side, and a transparent front panel (12) made of plastic material, whereby the transparent plastic film section (9a) is attached to the light-reflecting layer (22) by the adhesive layer (36) on its underside and the front panel (12) is attached to the transparent plastic film section (9a) by the adhesive layer (37) on the upper side of the transparent plastic film section, said registration sign further comprising a frame (21) made of plastic material and adapted to sealing the plastic film section (6a), the transparent plastic film section (9a), the front panel (12), and the bottom sheet (18) of said sign package (38) by surrounding the sign package, wherein
at least one transponder (50) for receiving and/or sending radio signals is disposed on the sign package (38) for the registration sign (2), and
the transponder (50) is embedded in the frame (21) after the frame has been injection-molded round the edges of the sign package (38) in order to seal the frame's plastic film section (6a), transparent plastic film section (9a), front panel (12), and bottom sheet (18).

2. A registration sign according to claim 1, wherein the sign package (38) for the registration sign (2), including those parts thereof which exhibit the transponder (50), exhibits a light-reflecting layer (22) with low content of metal material capable of hindering or damping radio signals.

3. A registration sign according to claim 1, wherein those portions of the sign package (38) for the registration sign (2) which exhibit the transponder (50) exhibit a light-reflecting layer (22) with low content of metal material capable of hindering or damping radio signals.

4. A registration sign according to claim 1, wherein those portions of the sign package (38) for the registration sign (2) which exhibit the transponder (50) lack at least said layer (22) of light-reflecting material, so that radio signals can pass to and/or from the transponder without being hindered or damped by the light-reflecting layer.

5. A registration sign according to claim 4, wherein those portions of the sign package (38) for the registration sign (2) which exhibit the transponder (50) lack both said layer (22) of light-reflecting material and the plastic film section (6a) to which said light-reflecting layer (22) is applied.

6. A registration sign according to claim 1, wherein the transponder (50) is disposed on a lower and/or upper longitudinal edge of the sign package (38) for the registration sign (2) and that the transponder is sealed by the frame (21).

7. A registration sign according to claim 1, wherein:
the registration sign (2) exhibits at least one recess (51) in which the transponder (50) is placed, and
the light-reflecting layer (22) in way of said recess (51) and in an edge region close to the recess exhibits low content of metal material capable of hindering or damping radio signals.

8. A registration sign according to claim 1, wherein:
the registration sign (2) exhibits at least one recess (51) in which the transponder (50) is placed, and
the light-reflecting layer (22) or both it and the plastic film section (6a) to which it is applied are absent in way of said recess (51) and in an edge region close to the recess.

9. A registration sign according to claim 7, wherein the recess (51) with the transponder (50) is formed in a lower and/or upper longitudinal edge of the sign package (38) for the registration sign (2) and is sealed by the frame (21).

10. A registration sign according to claim 1, wherein the transponder (50) is enclosed in a glass ampoule or equivalent.

11. A registration sign according to claim 1, wherein the transponder (50) exhibits at least one antenna (52) disposed on and/or in the sign package (38) for the registration sign (2).

12. A registration sign according to claim 11, wherein those portions of the sign package (38) for the registration sign (2) which exhibit the antenna (52) likewise exhibit a light-reflecting layer (22) with low content of metal material capable of hindering or damping radio signals.

13. A registration sign according to claim 11, wherein those portions of the sign package (38) or the registration sign (2) which exhibit the antenna (52) likewise lack said layer (22) of light-reflecting material or both said layer of light-reflecting material and the plastic film section (6a) to which said light-reflecting layer is applied.

14. A registration sign according to claim 11, wherein the antenna (52) is disposed on and extends along a lower and/or upper longitudinal edge of the sign package (38) for the registration sign (2) and that the antenna is sealed by the frame (21).

15. A registration sign according to claim 10, wherein the antenna (52) is enclosed in the glass ampoule together with the transponder (50).

16. A registration sign according to claim 11, wherein the antenna (52) is made of copper wire or equivalent.

17. A registration sign according to claim 1, wherein the transponder (50) is of RFID type and operates at a UHF frequency of 860-960 MHz.

18. A registration sign according to claim 1, wherein the transponder (50) is of active type with a battery of its own.

19. A registration sign according to claim 1, wherein the transponder (50) is of passive type without a battery of its own.

20. A registration sign according to claim 1, wherein the layer (22) of light-reflecting material consists of or contains metal material.

21. A method for the manufacture of registration signs (2) for vehicles, wherein:
- a plastic film strip (6) or a succession of individual plastic film sections (6a) is fed through a printer (24) in which a layer (22) of light-reflecting material on the plastic film strip or sections is provided with registration symbols (3),
- wherein a transparent plastic film strip (9) or individual transparent plastic film sections (9a) respectively are, by means of an adhesive layer (36), fixed on top of the light-reflecting layer (22) with registration symbols (3), transparent front panels (12) made of plastic material are, by means of an adhesive layer (37), fixed on top of the transparent plastic film strip (9) or the transparent plastic film sections (9a), bottom sheets (18) made of plastic material are, by means of an adhesive layer (39), fixed to the plastic film strip (6) or sections (6a) with said light-reflecting layer (22) on the opposite side from that layer, and wherein, where necessary, after said plastic film strips (6, 9), some time after being fixed together, have been cut to individual plastic film sections (6a, 9a), a frame (21) of plastic material is injection-molded round the edges of each sign package (38) which comprises one each of said plastic film sections (6a, 9a), bottom sheets (18) and front panels (12), for sealing thereof,
- wherein at least one transponder (50) for receiving and/or transmitting radio signals is fastened on the sign package (38) for the registration sign (2), and
- the transponder (50) is embedded in the frame (21) when the frame is injection-molded round the edges of the sign package (38).

22. A method according to claim 21, wherein the transponder (50) is fastened on and/or in a sign package (38) for the registration sign (2) which exhibits a light-reflecting layer (22) with low content of metal material capable of hindering or damping radio signals.

23. A method according to claim 21, wherein the transponder (50) is fastened on and/or in that portion of the sign package (38) for the registration sign (2) which exhibits a light-reflecting layer (22) with low content of metal material capable of hindering or damping radio signals.

24. A method according to claim 21, wherein the transponder (50) is fastened on and/or in that portion of the sign package (38) which lacks the light-reflecting layer (22), with the result that radio signals can pass to and/or from the transponder without being hindered or damped by the light-reflecting layer.

25. A method according to claim 21, wherein in those portions of the sign package (38) for the registration sign (2) on and/or in which the transponder (50) is intended to be fastened, at least said layer (22) of light-reflecting material is removed before said fastening.

26. A method according to claim 25, wherein in those portions of the sign package (38) for the registration sign (2) on and/or in which the transponder (50) is intended to be fastened, both said layer (22) of light-reflecting material and the plastic film section (6a) to which said layer of light-reflecting material is applied are removed before said fastening.

27. A method according to claim 21, wherein the transponder (50) is disposed on a lower and/or upper longitudinal edge of the sign package (38) for the registration sign (2) and that the frame (21) is injection-molded around the transponder.

28. A method according to claim 21, wherein:
- at least one recess (51) is formed in the sign package (38) for the registration sign (2), and
- the transponder (50) is disposed in the recess (51) and on and/or in that portion of the sign package (38) which exhibits a light-reflecting layer (22) with low content of metal material.

29. A method according to claim 21, wherein:
- at least one recess (51) is formed in the sign package (38) for the registration sign (2), and
- the transponder (50) is disposed in the recess (51) and on and/or in that portion of the sign package (38) which lacks said light-reflecting layer (22).

30. A method according to claim 28, wherein:
- the recess (51) is formed in a lower and/or upper longitudinal edge of the sign package (38) for the registration sign (2), and
- the frame (21) is injection-molded over said recess after the transponder (50) has been disposed therein.

31. A method according to claim 21, wherein the transponder (50) is provided with an antenna (52) disposed on and/or in the sign package (38) for the registration sign (2).

32. A method according to claim 31, wherein at least those portions of the sign package (38) for the registration sign (2) on and/or in which the antenna (52) is intended to be disposed are provided with said light-reflecting layer (22) with low content of metal material capable of hindering or damping radio signals.

33. A method according to claim 31, wherein said layer (22) of light-reflecting material or both said light-reflecting layer and the plastic film section (6a) to which it is attached is/are removed from those portions of the sign package (38) for the registration sign (2) on and/or in which the antenna (52) is intended to be disposed, before it is so disposed.

34. A method according to claim 31, wherein the antenna (52) is disposed on and caused to run along a lower and/or upper longitudinal edge of the sign package (38) for the registration sign (2), after which the frame (21) is injection-molded around the antenna.

35. A method according to claim 21, wherein the transponder (50) is disposed on and/or in the sign package (38) for the registration sign (2) by adhesive bonding.

36. A method according to claim 31, wherein the antenna (52) is disposed on and/or in the sign package (38) for the registration sign (2) by adhesive bonding.

37. A method according to claim 21, wherein information from the vehicle register is supplied to the transponder 50 and/or information from the transponder is supplied to the vehicle register after the frame (21) has been injection-molded round the edges of the sign package (38) for the registration sign (2).

38. A method according to claim 21, wherein the sign package (38) for the registration sign (2) is provided with a layer (22) of light-reflecting material which consists of or contains metal material.

* * * * *